United States Patent
Schmer

(10) Patent No.: US 10,984,255 B1
(45) Date of Patent: Apr. 20, 2021

(54) SYSTEMS AND APPLICATIONS FOR AUTOMATICALLY IDENTIFYING AND VERIFYING VEHICLE LICENSE PLATE DATA

(71) Applicant: Global Agility Solutions LLC, Austin, TX (US)

(72) Inventor: Jason Schmer, Austin, TX (US)

(73) Assignee: Global Agility Solutions, LLC, Austin, TX (US)

(*) Notice: Subject to any disclaimer, the term of this patent is extended or adjusted under 35 U.S.C. 154(b) by 0 days.

(21) Appl. No.: 17/061,420

(22) Filed: Oct. 1, 2020

Related U.S. Application Data

(60) Provisional application No. 62/909,210, filed on Oct. 1, 2019.

(51) Int. Cl.
*G06K 9/00* (2006.01)
*G06N 20/00* (2019.01)

(52) U.S. Cl.
CPC .......... *G06K 9/00785* (2013.01); *G06N 20/00* (2019.01); *G06K 2209/01* (2013.01); *G06K 2209/15* (2013.01); *G06K 2209/23* (2013.01)

(58) Field of Classification Search
CPC .......... G06K 9/00785; G06K 2209/01; G06K 2209/15; G06K 2209/23; G06N 20/00
See application file for complete search history.

(56) References Cited

U.S. PATENT DOCUMENTS

| | | | | |
|---|---|---|---|---|
| 9,349,140 | B2 * | 5/2016 | Christy | G06Q 30/0627 |
| 10,839,303 | B2 * | 11/2020 | Yi | G06K 9/00771 |
| 2007/0008179 | A1 * | 1/2007 | Hedley | G07B 15/06 340/928 |
| 2015/0049914 | A1 * | 2/2015 | Alves | G06K 9/033 382/105 |
| 2018/0300578 | A1 * | 10/2018 | Wilbert | G06K 9/00671 |
| 2019/0279293 | A1 * | 9/2019 | Tang | G06Q 40/025 |

* cited by examiner

*Primary Examiner* — David F Dunphy
(74) *Attorney, Agent, or Firm* — Shah IP Law, PLLC

(57) ABSTRACT

The present disclosure relates to systems and methods for automatically identifying and verifying vehicle license plate data. Specifically, the inventive system utilizes multiple automated data points to correlate a more accurate read of a license plate taken on roadways than systems that rely solely on Optical Character Recognition. The inventive system utilizes machine learning to automatically determine the make and model of the vehicle, which is then matched against motor vehicle records to provide for automation in the 80-90% range. The inventive system also utilizes analytics to determine if there are issues with the cameras and provides for near real time alerts to maintenance personnel.

20 Claims, 8 Drawing Sheets

US 10,984,255 B1

SYSTEMS AND APPLICATIONS FOR AUTOMATICALLY IDENTIFYING AND VERIFYING VEHICLE LICENSE PLATE DATA

CROSS-REFERENCE TO RELATED APPLICATIONS

The present application claims benefit of and priority to U.S. Provisional Patent Application No. 62/909,210 filed Oct. 1, 2019, entitled "SYSTEMS AND APPLICATIONS FOR AUTOMATICALLY IDENTIFYING AND VERIFYING VEHICLE LICENSE PLATE DATA," which is hereby incorporated by reference in its entirety as if fully set forth herein.

BACKGROUND

Field of the Art

This disclosure relates to systems and methods for automatically identifying and verifying vehicle license plate data.

Discussion of the State of the Art

Using computing systems to identify vehicles by their license plate identifier (ID) is a difficult task for a variety of reasons. For example, identifying a vehicle's license plate ID on a toll road or other checkpoints is particularly difficult because vehicles tend to traverse relevant checkpoints at high speeds. Moreover, visibility at these checkpoints is constantly changing due to changes in weather, including inclement weather such as rain, fog, snow, etc., and changes in the location and position of various light sources throughout any given period of time.

Currently, toll administration agencies and other agencies that are tasked with identifying vehicles by associated license plate identifiers (IDs) use automated license plate reader/recognition (ALPR) systems, which utilize cameras and optical character recognition (OCR) systems to identify a vehicle's license plate ID. These systems may be the best available solution, but they have significant limitations. For example, OCR systems tend to have high failure rates when dealing with changing light conditions and weather conditions. Moreover, these systems tend to have high failure rates when dealing with blurry images that may be caused by trying to capture vehicles that are moving at high speeds, especially in low-light situations when shutter speeds may be slow and/or image sensitivity (i.e. ISO sensitivity) settings may be high. In other instances, failure rates of the OCR systems may be caused by the camera becoming out of focus, which, in at least some camera systems, may happen quite frequently.

To combat some of these limitations, toll administration agencies and other similar agencies use a human review and verification process. This process requires humans to review and verify the accuracy of the OCR systems. Generally, in an effort to keep error rates low, once an OCR system attempts to recognize a license plate from an image, the recognized plate information and the associated image is sent to a human reviewer who may verify the accuracy of the OCR system or provide a substitute license plate ID if the OCR system fails. The human review system is much more accurate than the OCR system, but it is nevertheless very expensive to maintain, comparatively very slow, and human-error prone. Despite these significant drawbacks, toll administration agencies and other agencies tasked with identifying license plate information continue to use ALPR systems and human review systems despite it relatively high costs and slow review/confirmation process.

SUMMARY

The present invention enables a secondary review of ALPR systems. In other words, the present invention is for systems and methods for determining the likelihood that the license plate number (including letters and/or characters) that are identified by the ALPR system are in fact correct. The present invention represents automated systems and processes for reviewing and scoring the ALPR determination, wherein the the review process overcomes many of the limitations described above. For example, the automated review process of the present invention is significantly faster and more cost-effective. In addition, the presently disclosed systems and processes utilize the existing infrastructure associated with capturing vehicle license plate data.

More specifically, the present invention is for a computer program product comprising a non-transitory computer readable storage medium having instructions encoded thereon that, when executed by a processor, cause the processor to: receive, from a digital camera system, one or more images associated with a vehicle, the one or more images including a digital representation of at least one of a license plate identifier (ID) associated the vehicle, and a digital representation of the vehicle, send the one or more received images to an automatic license plate recognition (ALPR) system, receive a license plate ID from the ALPR system, obtain, from a first database, a vehicle identification number associated with the license plate ID that is received from the ALPR system, obtain, from a second database, at least one of vehicle make and model information associated with the obtained vehicle identification number, apply machine learning and prediction application to the one or more received images that are associated with the vehicle, predict, based on the applied machine learning and prediction application, at least one of make and model information of the vehicle that is represented in the one or more received images, compare the make and model information that is obtained from the second database to the make and model information that is predicted based on the applied machine learning and prediction application, and compute a comparison score based on the comparison between the make and model information that is obtained from the second database and the predicted make and model information, the comparison score indicting a likelihood that the license plate ID obtained from the ALPR system is the same the license plate ID that is represented in the one or more received images.

The present invention is for a method comprising: receiving, from a digital camera system, one or more images associated with a vehicle, the one or more images including a digital representation of at least one of a license plate identifier (ID) associated the vehicle, and a digital representation of the vehicle, sending the one or more received images to an automatic license plate recognition (ALPR) system, receiving a license plate ID from the ALPR system, obtaining, from a first database, a vehicle identification number associated with the license plate ID that is received from the ALPR system, obtaining, from a second database, at least one of vehicle make and model information associated with the obtained vehicle identification number, applying machine learning and prediction application to the one or more received images that are associated with the vehicle, predicting, based on the applied machine learning and prediction application, at least one of make and model information of the vehicle that is represented in the one or more received images, comparing the make and model information that is obtained from the second database to the make and model information that is predicted based on the applied machine learning and prediction application, and computing a comparison score based on the comparison between the make and model information that is obtained from the second database and the predicted make and model information, the comparison score indicting a likelihood that the license plate ID obtained from the ALPR system is the same the license plate ID that is represented in the one or more received images A variety of benefits flow from the inventive concept described herein, some of which are described herein. For example, the systems and processes described herein are fast, relatively cost efficient to maintain, less error prone, and can be implemented on top of existing recognition systems. For example, the systems and processes described herein can quickly retrieve the relevant information and process the relevant information in a machine learning environment for a quick analysis of whether the ALPR system recognized the license plate correctly. Indeed, the systems and processes described herein are much faster than human review systems. Moreover, because the systems and processes described herein are built to leverage independent source material (such as source images of vehicles and source material from trusted third party database), the systems and processes described herein tend to be less error prone and are much more easy to implement than, for example, a replacement system that may rely on an entirely new set of source material.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
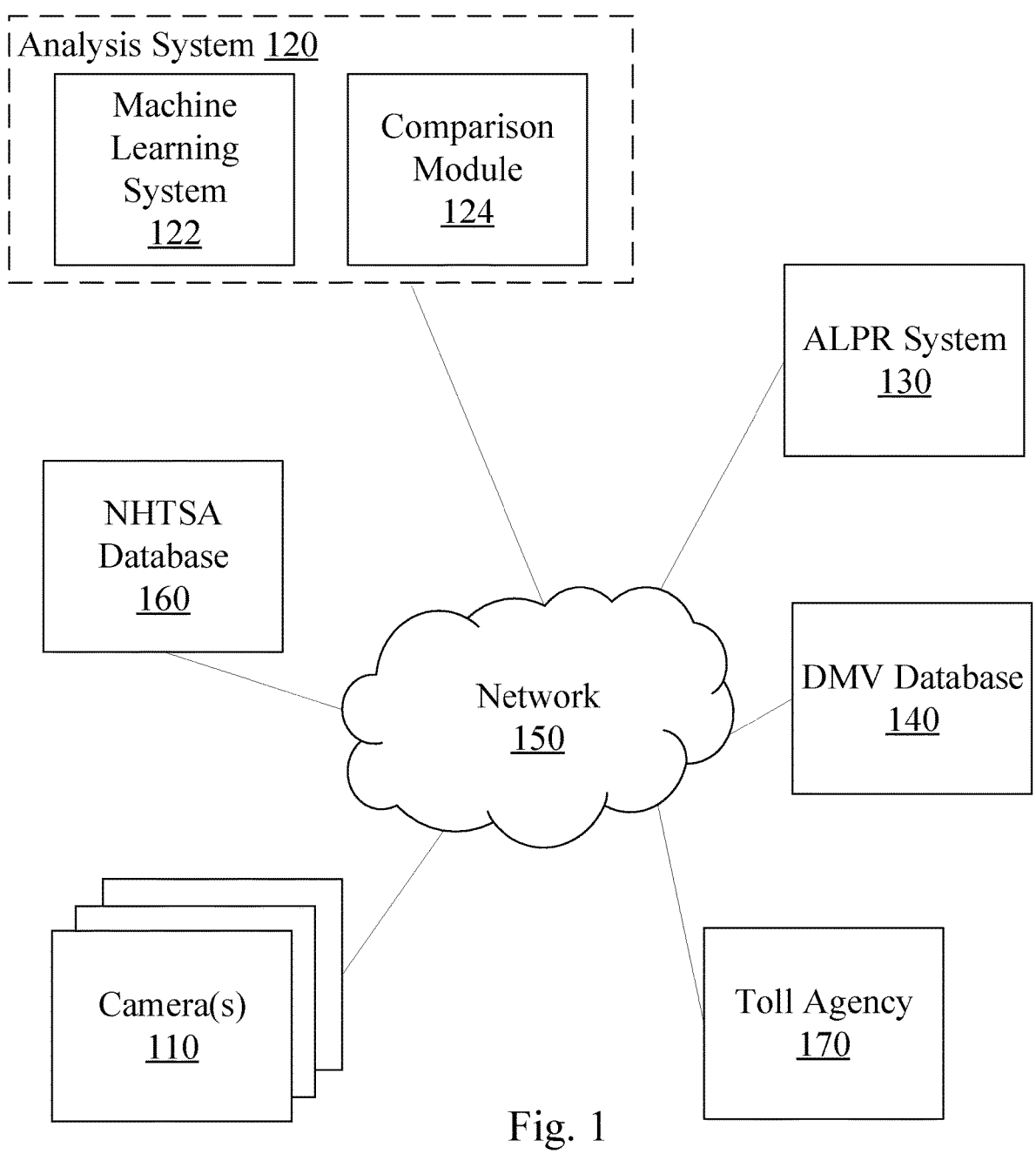
FIG. 1 illustrates various elements of an exemplary system for automatically identifying and verifying vehicle license plate data, according to one embodiment.

The inventive system and method described herein (hereinafter sometimes referred to more simply as "system" or "method") significantly increases the speed at which the accuracy of ALPR systems is verified. In other words, the inventive system utilizes multiple automated data points to verify the accuracy of license plate recognition systems. More specifically, the inventive system utilizes machine learning to automatically determine the make and model of a vehicle, which is then compared to make and model information associated with a license plate identifier (ID) that is recognized by the ALPR system. The systems may then ascribe high accuracy to recognized license plate IDs associated with make and model information that matches the determined make and model, and flag recognized license plate IDs associated with make and model information that do not match the determined make and model for further review. In this manner, the inventive systems and processes significantly speed up the ALPR verification process and significantly reduce the amount of items that have to be reviewed further by accurately flagging only the items that need further review.

More specifically, the present invention is for systems, method, and/or computer program products for determining a likelihood that an automatic license plate recognition system has correctly identified license plate data that is associated with a vehicle, the systems, method, and/or computer program products configured to: receive, from a digital camera system, one or more images associated with a vehicle, the one or more images including a digital representation of at least one of a license plate identifier (ID) associated the vehicle, and a digital representation of the vehicle; send the one or more received images to an automatic license plate recognition (ALPR) system; receive a license plate ID from the ALPR system; obtain, from a first database, a vehicle identification number associated with the license plate ID that is received from the ALPR system; obtain, from a second database, at least one of vehicle make and model information associated with the obtained vehicle identification number; apply machine learning and prediction application to the one or more received images that are associated with the vehicle; predict, based on the applied machine learning and prediction application, at least one of make and model information of the vehicle that is represented in the one or more received images; compare the make and model information that is obtained from the second database to the make and model information that is predicted based on the applied machine learning and prediction application; and compute a comparison score based on the comparison between the make and model information that is obtained from the second database and the predicted make and model information, the comparison score indicting a likelihood that the license plate ID obtained from the ALPR system is the same the license plate ID that is represented in the one or more received images.

The systems, method, and/or computer program products further comprising sending the received license plate ID to an agency via a communications protocol if the comparison score satisfies a threshold. In other words, systems, method, and/or computer program products may be configured to flag received license plate ID if the comparison score is below a threshold. In one embodiment, the license plate ID that is received from the ALPR system is identified using an optical character recognition system. In one embodiment, the license plate ID that is received from the ALPR system comprises at least one of numbers, letters, numerals, and characters.

The systems, method, and/or computer program products further configured to receive, from the ALPR system, a recognition confidence score that is associated with the received license plate ID, the recognition confidence score identifying a probability that the license plate ID identified by the ALPR system is the same as the license plate ID of the vehicle that is represented in the one or more received images. In one embodiment, the first database is a database comprising license plate IDs and vehicle identification numbers.

The systems, method, and/or computer program products further configured to obtain a prediction confidence score for each one or more make and model prediction that is predicted by applying the machine learning and prediction application, wherein a subset of the predictions are applied to the comparison step, and wherein the predictions comprise same make and model but different production year tags are grouped together. In one embodiment, the predication confidence score associated with the grouped data is a cumulative prediction confidence score that is associated with each prediction in the grouped data. In one embodiment, a manual review process is initiated when the comparison score does not satisfy a threshold.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary embodiment of a system for automatically identifying and verifying vehicle license plate data. The system includes an analysis system 120, an automated license plate reader/recognition (ALPR) system 130, a Department of Motor Vehicles (DMV) database 140, a toll agency 170, one or more camera(s) 110, a National Highway Transportation Safety Administration (NHTSA) database 160, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

Figure 2:
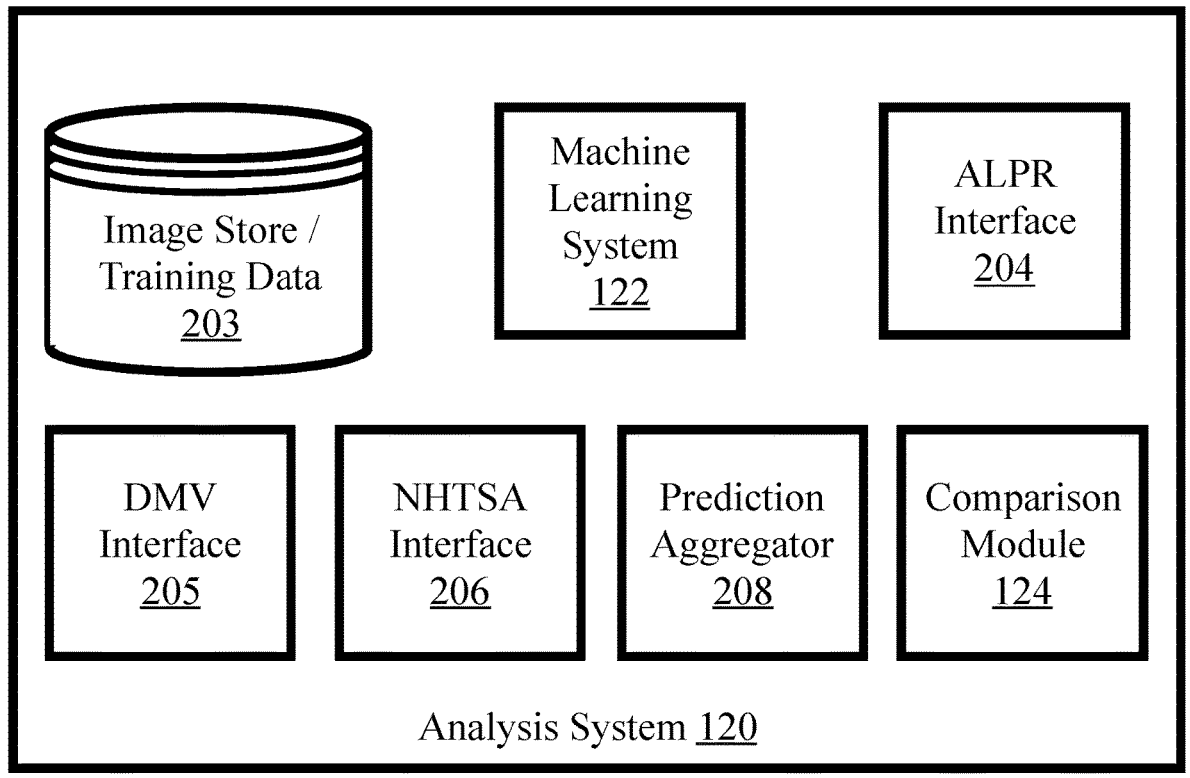
FIG. 2 illustrates the analysis system of the presently disclosed system for automatically identifying and verifying vehicle license plate data, according to one embodiment.

The analysis system 120 comprises a machine learning system 122 and a comparison module 124, which are described in greater detail in reference to FIG. 2. In general, the analysis system 120 applies machine learning to the received data in order to determine whether the license plate number identified by the ALPR system are accurate and/or compute a confidence score that may indicate the likelihood that that ALPR system correctly identified the license plate number that is associated with the relevant vehicle. The term license plate number or license plate identifier (ID) are used generically herein to refer to information that may be contained within a license plate (i.e. license plate data)—it may refer to any letters, characters, symbols, numbers, numerals, etc. that may be depicted on a license plate or other identifiers on a vehicle. The analysis system 120 may provide predicted license plate data and associated confidence level to the toll agency 170 via the network 150.

The one or more camera(s) 110 may comprise a variety of different cameras (or more generally, instruments to capture a digital representation of a vehicle), as would be apparent to a person of ordinary skill in the art, without departing from the scope of the invention. For example, one or more, or any combination of the following non-limiting examples may be used: still cameras, video cameras, thermal image cameras, ultraviolet (UV) cameras, burst speed cameras, three-dimensional (3D) cameras, time-of-flight (ToF) cameras, etc. In an embodiment, the one or more camera(s) 110 may capture a digital representation of a vehicle that may be passing through a field of view of the one or more camera(s) 110. The digital representation may be a still images, videos, thermal heat signature data, burst of images, 3D point clouds, etc. In an embodiment, the one or more camera(s) 110 may capture multiple images of a vehicle from multiple different perspectives, including, but not limited to, a front view, a back view, a perspective view, etc. The multiple perspectives may be stitched together to obtain a more complete digital representation of the vehicle. In other instances, the multiple captured data may be tagged with a similar or a same tag in a database to indicate that one or more images are associated with the same vehicle. In one embodiment, as discussed in more detail below, the digital representation of the vehicle may be used by the analysis system 120 to identify the make and model of the vehicle.

In an embodiment, the digital representation that is captured by the one or more camera(s) 110 may also include a digital representation of the license plate that may be attached or associated with the vehicle that is in the camera's 110 field of view (i.e. the vehicle that is imaged by the cameras 110). For example, if an image camera is used, the one or more camera(s) 110 may capture a digital image of the license plate that may be displayed on the vehicle. In some embodiments, a digital representation of the license plate may be captured by a second digital image, for example. In other embodiments, the digital representation of the license plate may be cropped from, or may represent a portion of the data that is captured of the vehicle. The digital representation of the license plate may be provided to the ALPR system 130, as described below, to identify the vehicle's license plate ID.

The ALPR system 130 may receive image data that is captured by the one or more camera(s) 110 and apply optical character recognition (OCR) analysis to the image file to identify the license plate IDs that are captured in the image. In one embodiment, the ALPR system 130 may crop to image data or other digital data to identify a portion of the digital data or image data that is associated with a license plate. In other embodiments, the ALPR system 130 may select one or more images within a group of images associated with a vehicle that best corresponds or most clearly displays a license plate. ALPR systems, such as the ALPR system 130, may be maintained by third-party vendors, or, may be implemented within the analysis system 120, as would be readily apparent to a person of ordinary skill in the art. The ALPR system 130 may apply OCR models to identify the characters, numbers, and/or letters that may comprise a license plate ID. In some embodiments, the OCR system may be trained to ignore items that are unlikely to be characters, numbers, and/or letters, as would be apparent to a person of ordinary skill in the art. In an embodiment, other computer vision systems for recognizing text may be employed by the ALPR system to identify license plate IDs in the digital representations captured by the camera(s) one or more 110. In an embodiment, machine learning models may be employed to identify the characters, numbers, and/or letters that license plate IDs comprise. In an embodiment, the ALPR system 130 may output the characters, numerals, and/or letters that may be identified from a license plate ID. In an embodiment, the ALPR system 130 may output a confidence score that is associated with outputted license plate information, wherein the confidence score indicates a probability that the outputted license plate information is correct.

The analysis system 120 may receive digital representation data that is captured by the one or more camera(s) 110 and apply machine learning models to identify additional information associated with the vehicle(s) that are captured in the digital representation data. Specifically, the machine learning system 122 may apply one or more machine learning models to identify a vehicle that may be captured in the digital representation data. As would be apparent to a person of ordinary skill in the art, a variety of different machine learning models may be used, including supervised learning models, such as Markov models, Regression Models, Decision Tree Models, Random Forest Models, k-nearest neighbors (KNN) Models, Logistic Regression Models, unsupervised learning models, and reinforcement models may be used without departing from the scope of the invention. Training datasets used to create one or more of the one or more machine learning models may comprise digital representations of a variety of different vehicles and associated identifying information. The identifying information may include, but is not limited to: make and/or model information (or in other words, information about the manufacturer of the vehicle, and/or the model name/number of the vehicle), the year the vehicle was manufactured, and/or other identifying information about the vehicle such as color, special badging regarding engine size, for example, or trim level, etc. The machine learning system 122 may recognize identifying information from the digital representation data. The machine learning system 122 may provide results to the comparison module 124.

The DMV database 140 refers to a database that maintains a vehicle identification number (VIN) that is associated with one or more license plate numbers. It may be used to look up a vehicle identification number (VIN) that is associated with a license plate ID that is recognized by the ALPR system 130. The DMV database 140 may provide results to the analysis system 120. The DMV database 140 may provide results to the comparison module 124. The DMV database may also be referred to as a first database herein.

The NHTSA database 160 refers to a database that maintains vehicle data associated with one or more VIN numbers. It may be used to lookup make and model information that is associated with a VIN that is obtained from the DMV database 140. The NHTSA database 160 may provide results to the analysis system 120. The NHTSA database 160 may provide results to the comparison module 124. The NHTSA database may also be referred to as a second database herein.

The analysis system 120 may compare the identifying information that is recognized by the machine learning system 122 to the information that is obtained from other databases. In an embodiment, the comparison module 124 may obtain the identifying information from the machine learning system 122 and compare the identifying information to information received from the NHTSA database 160. For example, if make and model information (first make and model) is obtained from the machine learning system 122 and make and model information (second make and model) is obtained from the NHTSA database 160, then the two sets of makes and models (first make and model and second make and model) may be compared. In an embodiment, the comparison module 124 may compare text received from the machine learning system 122 with text obtained from other databases, such as the NHTSA database 160. In an embodiment, the identifying information received from the machine learning system 122 and/or information on obtained from other databases, such as the NHTSA database 160, may be filtered through a dictionary or a set of terms about make and model. In an embodiment, the results of machine learning system 122 may be trimmed or formatted for an appropriate comparison. For example, the machine learning system 122 may provide numerous results, including multiple makes and models. The comparison module 124 may trim the results and/or standardize the results to enable an appropriate comparison with results obtained from other databases, such as the NHTSA database 160.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

FIG. 2 illustrates the analysis system 120 of the presently disclosed system for automatically identifying and verifying license plate data. The analysis system 120 may comprise image store/training data 203, the machine learning system 122, an automated license plate reader/recognition (ALPR) interface 204, a Department of Motor Vehicles (DMV) interface 205, a National Highway Transportation Safety Administration (NHTSA) interface 206, a prediction aggregator 208, and the comparison module 124. The analysis system 120 may utilize machine learning to analyze a vehicle license plate image and predict a vehicle's make and model. The vehicle make and model prediction may be used to determine a confidence level of license plate data provided to the toll agency 170.

The image store/training data 203 may store images that are obtained as a part of the training dataset, and/or images that are obtained from camera(s) 110 that need analysis. The image store/training data 203 may comprise training images and training tags comprising vehicle identifying information such as make, model, year, etc. that is associated with the training images. The training data is described in more detail below in reference to the machine learning system 122.

The ALPR interface 204 may interface with the ALPR system 130 to obtain license plate information that may have been recognized from one or more images. The ALPR interface 204 may allow the analysis system 120 to transmit one or more images to the ALPR system 130 via the network 150. The ALPR interface 204 may allow the analysis system 120 to receive a set of characters (numbers and/or letters) representing license plate information from the ALPR system 130 via the network 150. In one embodiment, the ALPR system 130 may be a part of the analysis system 120, wherein, the ALPR system 130 may be a part of the analysis performed by the analysis system 120.

The DMV interface 205 may interface with the DMV (or some other similar database) that may store license plate information and vehicle identification number (VIN) information that may be associated with the license plate. The DMV interface 205 may allow the analysis system 120 to transmit the set of characters (i.e. data) representing license plate information to the DMV database 140 via the network 150. The DMV interface 205 may allow the analysis system 120 to receive VIN information from the DMV database 140 via the network 150. In one embodiment, the received VIN information is associated with the license plate information that is transmitted to the DMV database. In one embodiment, the DMV interface 205 may analyze the received VIN information to verify that the received information is comprised of a number of characters that are typically associated with a VIN. In one embodiment, the DMV interface 205 may perform a lookup-function within the DMV database and identify lookup results as relevant VINs.

The NHTSA interface 206 may interface with the NHTSA database 160 (or some other similar database) that may store VIN, and vehicle identifying information, such as vehicle make and model information, that is associated with a VIN. The NHTSA interface 206 may allow the analysis system 120 to transmit VIN information to the NHTSA database 160 (or other similar database) via the network 150. The NHTSA interface 206 may allow the analysis system 120 to receive relevant vehicle identifying information from the NHTSA database 160 (or other similar database) via the network 150. The received relevant vehicle identifying information is associated with the VIN number in the NHTSA database. A variety of different vehicle identifying information may be received, including, but not limited to vehicle make information, vehicle model information, special badging information, vehicle trim level data, model year information, factory paint color information, etc. In one embodiment, the NHTSA interface 206 may perform a look-up function within the NHTSA database based on the VIN and retrieving vehicle identifying information that is associated with the VIN.

The machine learning system 122 may apply a machine learned model to identify likely identifying information, such as make and model information, of a vehicle that may be in one or more image files. A variety of different machine learning models may be used as would be apparent to a person of ordinary skill in the art, including, but not limited to Markov models, Regression Models, Decision Tree Models, Random Forest Models, k-nearest neighbors (KNN) Models, Logistic Regression Models, unsupervised learning models, deep learning models, reinforcement models, etc. In one embodiment, the machine learned model may be developed from a training data set. For example, in a non-limiting embodiment, each image in the image repository may includes an image identifier and metadata corresponding to the file. In one embodiment, the image identifier is a part of the image metadata. Examples of image metadata include, but are not limited to, vehicle make information, vehicle model information, special badging information, vehicle trim level data, model year information, paint color information, etc. Each image metadata attribute become a training attribute that may be utilized under different training and similarity iterations. In one embodiment, the machine learning system 122 may generate a representation of image features in the form of vectors, thereby quantifying image understanding and classification for similarity computation. In one embodiment, the learning component of the machine learning system 122 is utilized for normalization, for summarizing the learning in a linear multi-dimensional vector, and the prediction component of the machine learning system 122 is utilized for classification and predicting class labels, such as vehicle make information and/or vehicle model information, etc. The machine learning system 122 utilizes image training data from a training data repository to obtain training data for training model weights. Once a training is complete and a prediction model is generated, the prediction model may be applied by the machine learning system 122 to predict the make and model associated with images that are obtained from the imaging system.

The prediction aggregator 208 may combine multiple results from the machine learning system 122 if the multiple results have common make and model information. In an embodiment, the prediction aggregator 208 combines results if the make/models for various results are the same and sums up the total number of predicted vehicles per make/model. For example, the machine learning system 122 may determine that a vehicle is 94% Toyota Corolla 2006 CE, 3% Toyota Corolla 2005 SE, 1% Toyota Corolla 2003 LE, 1% Ford Focus 2005 S 1%, and Ford Focus 2004 SEL. The prediction aggregator 208 may calculate the results as 98% (94%+3%+1%) probability of being a Toyota Corolla and 2% probability of being a Ford Focus (1%+1%). If a certain threshold is met for the vehicle being of a certain make/model, such as, but not exclusively, 95%, then the calculated make/model determined by the machine learning system 122 may be sent to the comparison module 124. If the threshold is not met, then a human operator may be notified for involvement in determining the license plate information.

The comparison module 124 may compare the identifying information, such as make and model data, obtained from the NHTSA database 160 (or other similar database) with the aggregated identifying information, such as make and model data, obtained from the prediction aggregator 208. The comparison module 124 may compute a comparison score based on the comparison between the make and model information that is obtained from the second database and the predicted make and model information. In one embodiment, the comparison module 124 may compute a comparison score based on the comparison between the make and model information that is obtained from the NHTSA database 160 and the predicted make and model information from the prediction aggregator 208. The comparison score may indicate a likelihood that the license plate ID obtained from the ALPR system is the same as the license plate ID that is represented in the one or more received images. If the make/model information matches or matches within a threshold range, then the license plate information may be sent to a billing department associated with the toll agency 170. If there is a discrepancy or if the match score is below a threshold, then the information may be sent to a human reviewer to determine the license plate based on digital data obtained from the cameras 110.

In one embodiment, the comparison data may be used to update or re-train the machine learning system 122 and/or the training data that is stored in the image store/training data store 203. For example, if the digital data associated with a vehicle produces similar results (and/or similar within a threshold) from the machine learning system 122 and the DMV database, then the received digital data may be tagged as ground truth data with the vehicle make/model information and/or any other information that was associated the results from the machine learning system 122 and/or the DMV database. In this instance, the machine learning system 122 prepares ground truth data from the data obtained from the comparison module and include vehicle make/model and/or other information as label or parameter data. The machine learning system 122 trains a second machine learning algorithm based on the ground truth data and/or updates the prior model with this new training data.

Figure 3A:
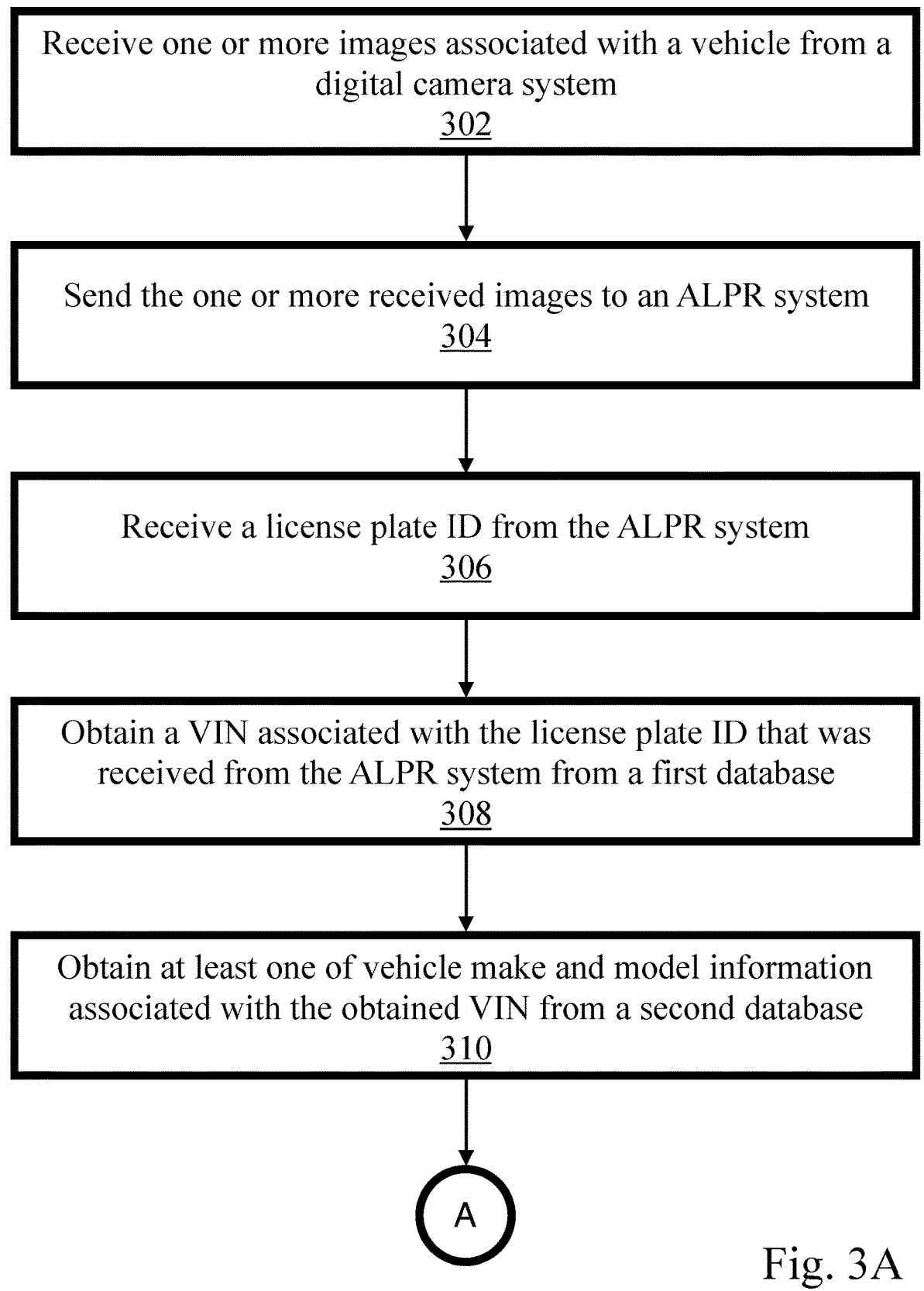
FIGS. 3A-3B illustrate a flowchart of an exemplary process for automatically identifying and verifying license plate data, according to one embodiment.
Figure 3B:
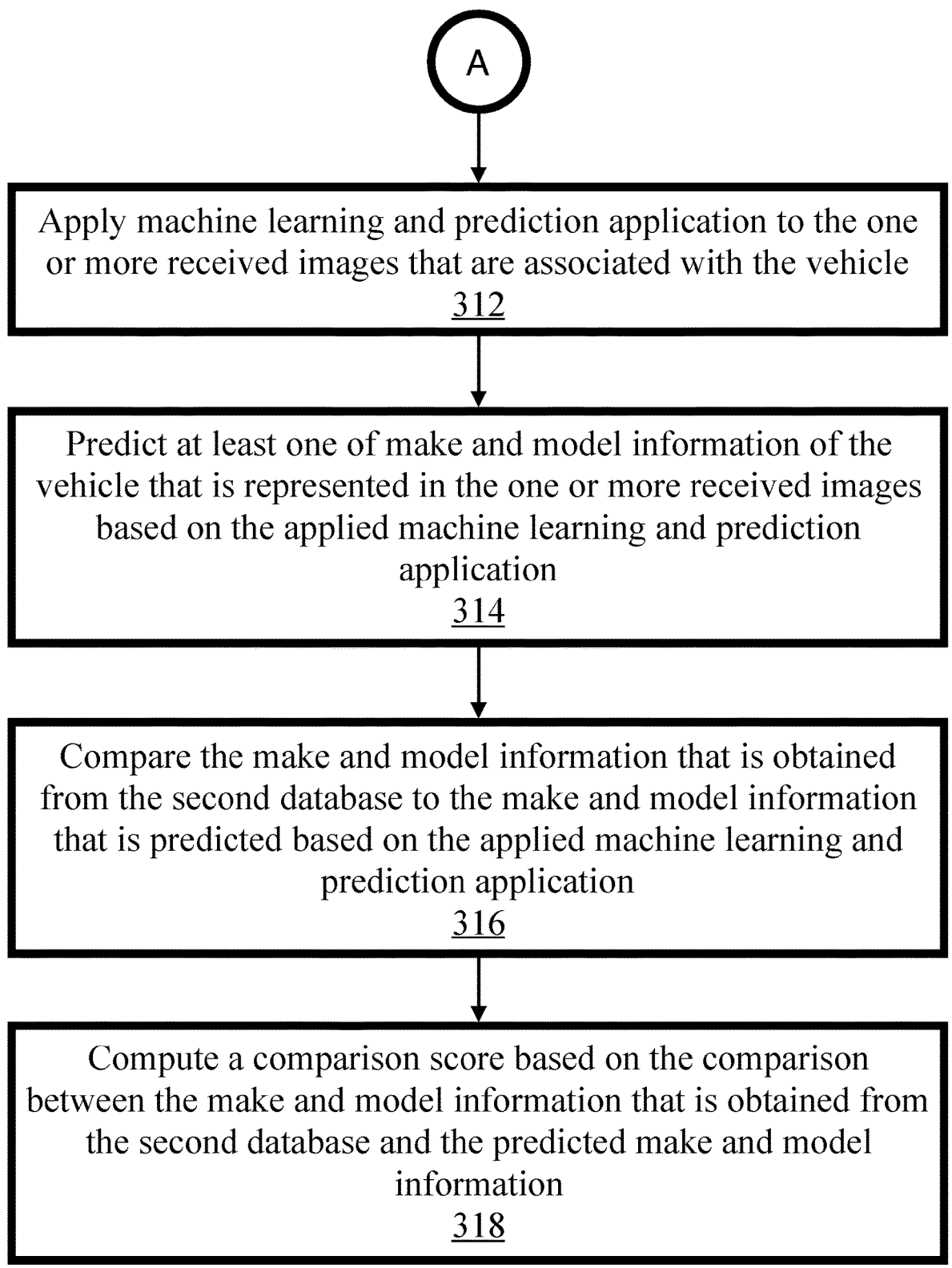

In One Embodiment, if the Digital Data Obtained from the Cameras 110 is Reviewed by the Human, the Human Provided Data May be Used to Update the Training Dataset and/or Retrain the Machine Learned Model Processes for Identifying and Verifying License Plate Data FIGS. 3A-3B illustrate an exemplary process for automatically identifying and verifying license plate data. At step 302, one or more images associated with a vehicle may be received from a digital camera system. The analysis system 120 may receive one or more images associated with a vehicle from the one or more camera(s) 110. The one or more images may include a digital representation of at least one of a license plate identifier (ID) associated the vehicle, and a digital representation of the vehicle.

At step 304, the one or more received images may be sent to an automatic license plate recognition (ALPR) system. The analysis system 120 may send the one or more received images to the automatic license plate recognition (ALPR) system 130.

At step 306, a license plate identifier (ID) may be received from the ALPR system. The analysis system 120 may receive a license plate ID from the ALPR system 130. The ALPR system may use a variety of different identification methodologies, including OCR etc. without departing from the scope of the invention. In one embodiment, the license plate ID may be received in the form of a text file, wherein the characters, letters, and/or numerals in the license plate may be provided for further processing. The license plate ID that is received from the ALPR system may be identified using an optical character recognition (OCR) system. The license plate ID that is received from the ALPR system may comprise at least one of numbers and/or letters. A recognition confidence score that is associated with the received license plate ID may be received from the ALPR system. The analysis system 120 may receive a recognition confidence score from the ALPR system 130 that is associated with the received license plate ID from the ALPR system 130. The recognition confidence score may identify a probability that the license plate ID identified by the ALPR system is the same as the license plate ID of the vehicle that is represented in the one or more received images.

At step 308, a vehicle identification number associated with the license plate ID that is received from the ALPR system may be obtained from a first database. The analysis system 120 may obtain, from the DMV database 140, a vehicle identification number (VIN) associated with the license plate ID that is received from the ALPR system 130. The VIN may be received from a Department of Motor Vehicles (DMV) database. The VIN may be received from any database that stores license plate information and related VIN information. The first database may be a database comprising license plate IDs and vehicle identification numbers (VINs).

At step 310, at least one of vehicle make and model information associated with the obtained vehicle identification number may be obtained from a second database. The analysis system 120 may obtain, from the NHTSA database 160, at least one of vehicle make and model information associated with the obtained vehicle identification number (VIN). The vehicle make and model information may comprise, for example, "NISSAN" and "PATHFINDER." In an embodiment, certain characteristics associated with make and model information may be stripped or ignored in the data file. For example, engine size markings or style badges such as "SE" may be ignored.

At step 312, machine learning and prediction application may be applied to the one or more received images that are associated with the vehicle. The analysis system 120 may use the machine learning system 122 to apply machine learning and prediction application to the one or more received images that are associated with the vehicle.

At step 314, at least one of make and model information of the vehicle that is represented in the one or more received images may be predicted based on the applied machine learning and prediction application. The analysis system 120 may use the machine learning system 122 to predict, based on the applied machine learning and prediction application, at least one of make and model information of the vehicle that is represented in the one or more received images. In an embodiment, the process enables segregation of vehicles by make/models and sum up the total number of predicted vehicles per make/model. For example, the machine learning system 122 may determine that a vehicle is 94% Toyota Corolla 2006 CE, 3% Toyota Corolla 2005 SE, 1% Toyota Corolla 2003 LE, 1% Ford Focus 2005 S 1%, and Ford Focus 2004 SEL. The machine learning system 122 may calculate the results as 98% (94%+3%+1%) probability of being a Toyota Corolla and 2% probability of being a Ford Focus (1%+1%). If a certain threshold is met for the vehicle being of a certain make/model, such as, but not exclusively, 95%, then the calculated make/model determined by the machine learning system 122 may be sent to the comparison module 124. If the threshold is not met, then a human operator may be notified for involvement in determining the license plate information.

A prediction confidence score may be obtained for each one or more make and model prediction that is predicted by applying the machine learning and prediction application. The analysis system 120 may obtain a prediction confidence score for each one or more make and model prediction that is predicted by applying the machine learning and prediction application. A subset of the predictions may be applied to the comparison step (step 316). The predictions that comprise the same make and/or model but different production year tags may be grouped together. The predication confidence score associated with the grouped data may be a cumulative prediction confidence score that is associated with each prediction in the grouped data.

At 316, the make and model information that is obtained from the second database may be compared to the make and model information that is predicted based on the applied machine learning and prediction application. The analysis system 120 may use the comparison module 124 to compare the make and model information that is obtained from the NHTSA database 160 to the make and model information that is predicted based on the applied machine learning and prediction application.

At 318, a comparison score may be computed based on the comparison between the make and model information that is obtained from the second database and the predicted make and model information. The analysis system 120 may use the comparison module 124 to compute a comparison score based on the comparison between the make and model information that is obtained from the NHTSA database 160 and the predicted make and model information. The comparison score may indicate a likelihood that the license plate ID obtained from the ALPR system is the same as the license plate ID that is represented in the one or more received images. If the make/model information matches, then the license plate information may be sent to a billing department associated with the toll agency 170. If there is a discrepancy, then the information may be sent to a human reviewer to determine the license plate and make and/or model. The human reviewed make and/or model and associated one or more images may be used to update (e.g., train, etc.) the machine learning system 122.

The license plate ID that is received from the ALPR system may be sent to an agency via a communications protocol if the comparison score satisfies a threshold. A manual review process may be initiated when the comparison score does not satisfy a threshold. The analysis system 120 may initiate a manual review process when the comparison score does not satisfy a threshold.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
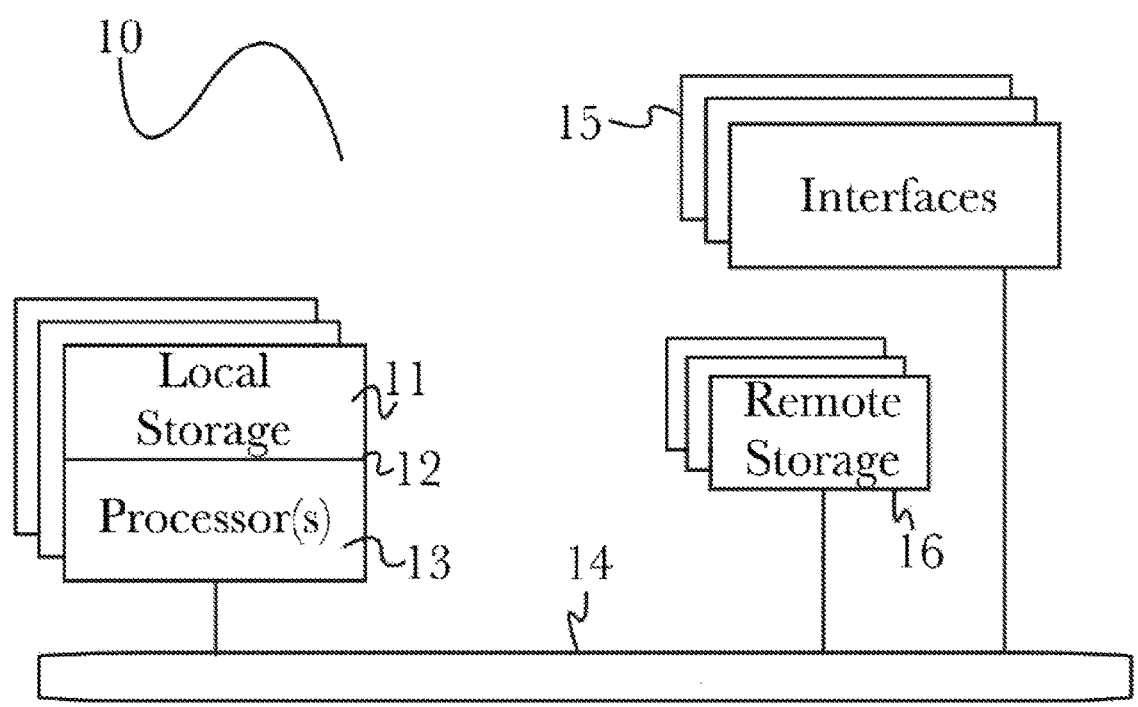
FIG. 4 illustrates components of an exemplary computing device that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
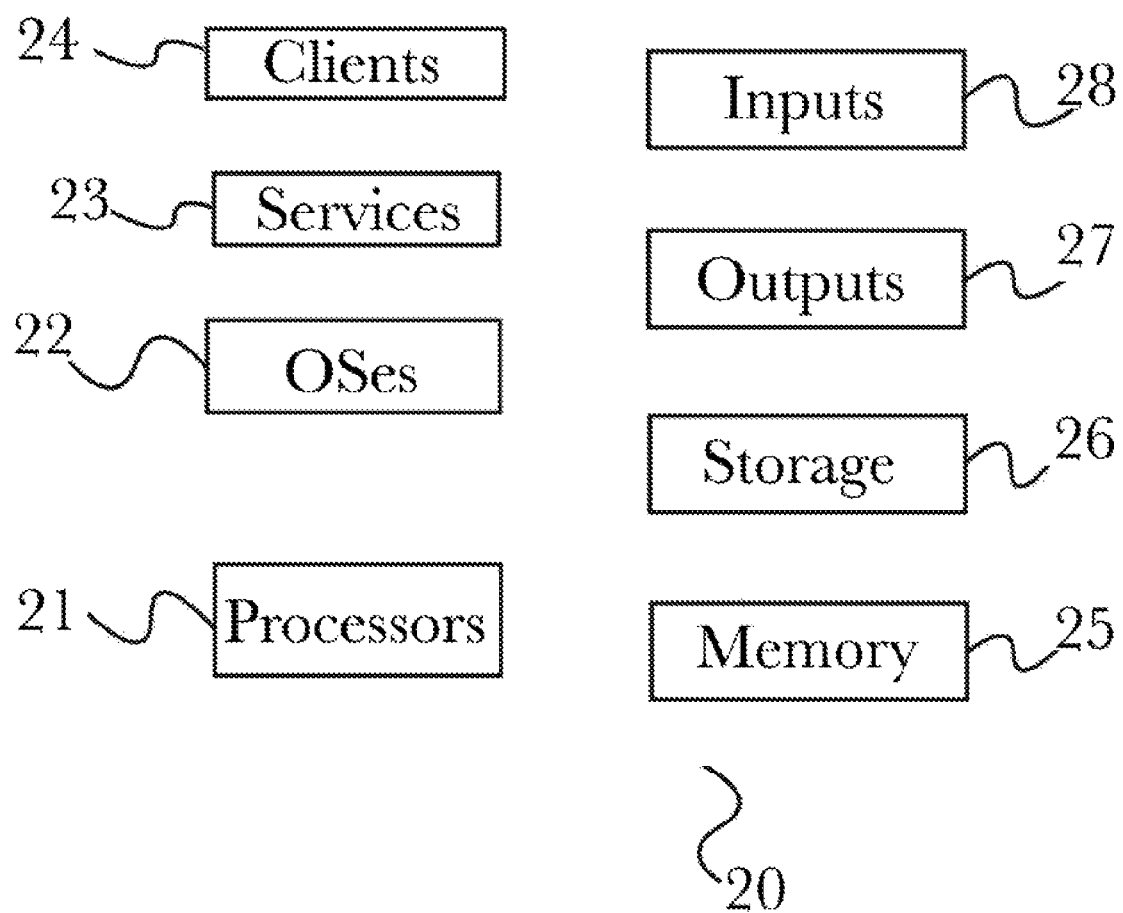
FIG. 5 illustrates one embodiment of a standalone computing system that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 6:
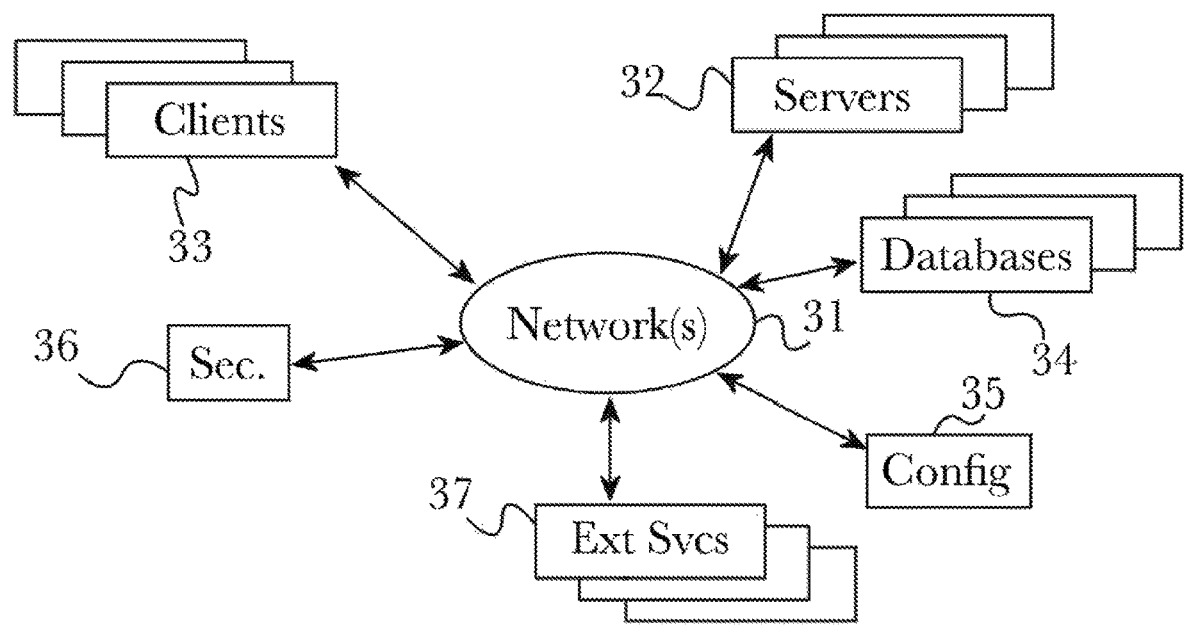
FIG. 6 illustrates an exemplary distributed computing network that supports an exemplary embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
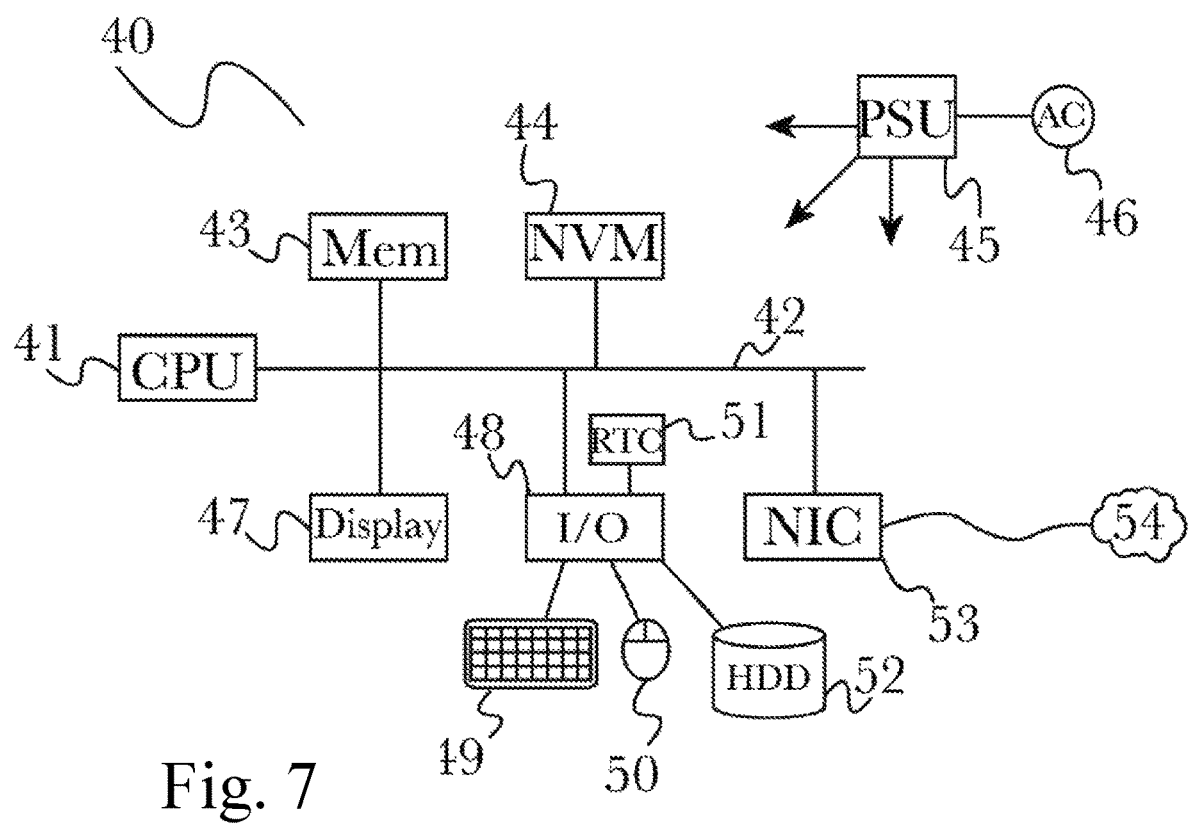
FIG. 7 illustrates an exemplary overview of a computer system that supports an exemplary embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product for determining a likelihood that an automatic license plate recognition system has correctly identified license plate data that is associated with a vehicle, the computer program product comprising a non-transitory computer readable storage medium having instructions encoded thereon that, when executed by a processor, cause the processor to:
   receive, from a digital camera system, one or more images associated with a vehicle, the one or more images including a digital representation of at least one of a license plate identifier (ID) associated the vehicle, and a digital representation of the vehicle;
   send the one or more received images to an automatic license plate recognition (ALPR) system;
   receive a license plate ID from the ALPR system;
   obtain, from a first database, a vehicle identification number associated with the license plate ID that is received from the ALPR system;
   obtain, from a second database, at least one of vehicle make and model information associated with the obtained vehicle identification number;
   apply machine learning and prediction application to the one or more received images that are associated with the vehicle;
   predict, based on the applied machine learning and prediction application, at least one of make and model information of the vehicle that is represented in the one or more received images;
   compare the make and model information that is obtained from the second database to the make and model information that is predicted based on the applied machine learning and prediction application; and
   compute a comparison score based on the comparison between the make and model information that is obtained from the second database and the predicted make and model information, the comparison score indicting a likelihood that the license plate ID obtained from the ALPR system is the same the license plate ID that is represented in the one or more received images.

2. The computer program product of claim 1, wherein the license plate ID that is received from the ALPR system is sent to an agency via a communications protocol if the comparison score satisfies a threshold.

3. The computer program product of claim 1, wherein the license plate ID that is received from the ALPR system is identified using an optical character recognition system.

4. The computer program product of claim 1, wherein the license plate ID that is received from the ALPR system comprises at least one of numbers and letters.

5. The computer program product of claim 1, wherein the instructions further cause the processor to:
   receive, from the ALPR system, a recognition confidence score that is associated with the received license plate ID, the recognition confidence score identifying a probability that the license plate ID identified by the ALPR system is the same as the license plate ID of the vehicle that is represented in the one or more received images.

6. The computer program product of claim 1, wherein the first database is a database comprising license plate IDs and vehicle identification numbers.

7. The computer program product of claim 1, wherein the instructions further cause the processor to:
   obtain a prediction confidence score for each one or more make and model prediction that is predicted by applying the machine learning and prediction application.

8. The computer program product of claim 7, wherein a subset of the predictions are applied to the comparison step.

9. The computer program product of claim 7, wherein the predictions comprise same make and model but different production year tags are grouped together.

10. The computer program product of claim 9, wherein the predication confidence score associated with the grouped data is a cumulative prediction confidence score that is associated with each prediction in the grouped data.

11. The computer program product of claim 1, wherein the instructions further cause the processor to:
   initiate a manual review process when the comparison score does not satisfy a threshold.

12. A method for determining a likelihood that an automatic license plate recognition system has correctly identified license plate data that is associated with a vehicle, the method comprising:
   receiving, from a digital camera system, one or more images associated with a vehicle, the one or more images including a digital representation of at least one of a license plate identifier (ID) associated the vehicle, and a digital representation of the vehicle;
   sending the one or more received images to an automatic license plate recognition (ALPR) system;
   receiving a license plate ID from the ALPR system;
   obtaining, from a first database, a vehicle identification number associated with the license plate ID that is received from the ALPR system;
   obtaining, from a second database, at least one of vehicle make and model information associated with the obtained vehicle identification number;
   applying machine learning and prediction application to the one or more received images that are associated with the vehicle;
   predicting, based on the applied machine learning and prediction application, at least one of make and model information of the vehicle that is represented in the one or more received images;
   comparing the make and model information that is obtained from the second database to the make and model information that is predicted based on the applied machine learning and prediction application; and computing a comparison score based on the comparison between the make and model information that is obtained from the second database and the predicted make and model information, the comparison score indicting a likelihood that the license plate ID obtained from the ALPR system is the same the license plate ID that is represented in the one or more received images.

13. The method of claim 12, wherein the license plate ID that is received from the ALPR system is sent to an agency via a communications protocol if the comparison score satisfies a threshold.

14. The method of claim 12, wherein the license plate ID that is received from the ALPR system is identified using an optical character recognition system.

15. The method of claim 12, wherein the license plate ID that is received from the ALPR system comprises at least one of numbers and/or letters.

16. The method of claim 12, further comprising receiving, from the ALPR system, a recognition confidence score that is associated with the received license plate ID, the recognition confidence score identifying a probability that the license plate ID identified by the ALPR system is the same as the license plate ID of the vehicle that is represented in the one or more received images.

17. The method of claim 12, wherein the first database is a database comprising license plate IDs and vehicle identification numbers.

18. The method of claim 12, further comprising obtaining a prediction confidence score for each one or more make and model prediction that is predicted by applying the machine learning and prediction application.

19. The method of claim 18, wherein a subset of the predictions are applied to the comparison step.

20. The method of claim 18, wherein the predictions comprise same make and model but different production year tags are grouped together.

* * * * *